(12) United States Patent
Brillante et al.

(10) Patent No.: US 10,936,368 B2
(45) Date of Patent: *Mar. 2, 2021

(54) WORKLOAD MANAGEMENT WITH DELEGATED CORRECTION OF EXECUTION ISSUES FOR IMPROVING A FUNCTIONING OF COMPUTING MACHINES

(71) Applicant: International Business Machines Corporation, Armonk, NY (US)

(72) Inventors: Francesco Brillante, Scafati (IT); Arcangelo Di Balsamo, Rome (IT); Luca Lazzaro, Naples (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,087

(22) Filed: Nov. 4, 2019

(65) Prior Publication Data
US 2020/0065145 A1 Feb. 27, 2020

Related U.S. Application Data

(63) Continuation of application No. 15/823,695, filed on Nov. 28, 2017, now Pat. No. 10,521,270.

(51) Int. Cl.
*G06F 9/50* (2006.01)
*G06F 9/48* (2006.01)

(52) U.S. Cl.
CPC .............. *G06F 9/50* (2013.01); *G06F 9/4881* (2013.01); *G06F 9/5038* (2013.01)

(58) Field of Classification Search
CPC ........ G06F 9/50; G06F 9/4843; G06F 9/4881; G06F 9/5011; G06F 9/5038; G06F 9/5066

See application file for complete search history.

(56) References Cited

U.S. PATENT DOCUMENTS 9,235,440 B2   1/2016  Cardelli et al.
9,477,523 B1  10/2016  Warman et al.
(Continued)

OTHER PUBLICATIONS

Lee et al., Rescheduling for reliable job completion with the support of clouds, Article in Future Generation Computer Systems—Oct. 2010, DOI: 10.1016/j.future.2010.02.010, 9 pages.
(Continued)

*Primary Examiner* — Dong U Kim
(74) *Attorney, Agent, or Firm* — Schmeiser, Olsen & Watts, LLP; Aaron Pontikos

(57) ABSTRACT

A method and system for improving a functioning of critical execution computing machines. A promoted critical execution computing machine determines one or more correction actions for reducing an impact of an execution issue on execution of critical work units by respective critical execution computing machines on the execution of the critical work units by the respective critical execution computing machines according to global correction information, local correction information, and peer correction information. The global correction information had been received from a scheduling computing machine and relates to the critical work units and to the critical execution computing machines. The local correction information relates to each corresponding critical work unit and to a status of the promoted critical execution computing machine. The peer correction information relates to the corresponding critical work units and to a corresponding status of the other critical execution computing machines.

20 Claims, 6 Drawing Sheets

(56) References Cited

U.S. PATENT DOCUMENTS

| | | |
|---|---|---|
| 2001/0021913 A1 | 9/2001 | Leymann et al. |
| 2007/0133781 A1* | 6/2007 | Febonio .............. H04M 3/5175 |
| | | 379/265.05 |
| 2009/0327317 A1 | 12/2009 | Ulmer et al. |
| 2011/0238458 A1 | 9/2011 | Purcell et al. |
| 2012/0215583 A1* | 8/2012 | Kunti .................... G06Q 10/06 |
| | | 705/7.27 |
| 2014/0129284 A1 | 5/2014 | Rexrode et al. |
| 2016/0306661 A1 | 10/2016 | Di Balsamo et al. |
| 2019/0163526 A1 | 5/2019 | Brillante et al. |

OTHER PUBLICATIONS

Notice of Allowance (dated Aug. 22, 2019) for U.S. Appl. No. 15/823,695, filed Nov. 28, 2017.

* cited by examiner

WORKLOAD MANAGEMENT WITH DELEGATED CORRECTION OF EXECUTION ISSUES FOR IMPROVING A FUNCTIONING OF COMPUTING MACHINES

This application is a continuation application claiming priority to Ser. No. 15/823,695, filed Nov. 28, 2017.

TECHNICAL FIELD

The present invention relates to information technology, and more specifically to workload management for improving a functioning of computing machines.

BACKGROUND

Workload management is a common activity that is typically implemented by workload schedulers to manage execution of large numbers of work units in computing systems (for example, batch jobs). For this purpose, each workload scheduler arranges the work units into a workload plan. The workload plan defines a flow of execution of the work units according to corresponding constraints (for example, expected execution times and dependencies on other work units).

The workload plan is aimed at achieving one or more desired targets. For example, these targets comprise the completion of specific work units within corresponding (completion) deadlines; typical examples are work units required for business activities or subject to Service Level Agreements (SLAs), such as relating to daily settlement of payments in financial applications. Therefore, any (execution) issue in the execution of the work units that causes the missing of some targets of the workload plan (for example, a significant delay in the execution of a work unit required to meet the targets) may have quite serious consequences (for example, business outages, payment of penalties).

However, the management of the workload plan (to monitor the execution of work units and to intervene in an attempt to solve any execution issue relating thereto) is quite difficult. Indeed, the work units generally define complex workload networks defined by their dependencies, shared execution resources and/or common targets.

Therefore, manual analyses of the execution of the work units (for example, by a system administrator) may be ineffective in determining the actual impact of any execution issue on the whole workload plan and in determining possible solutions that might be applied for avoiding the missing of the corresponding targets.

Statistical analyses may also be exploited to facilitate the management of the workload plan. Particularly, the statistical analyses are used to forecast the impact of each execution issue and of each solution on the whole workload plan according to corresponding historical information. However, the statistical analyses are detached from the real-time condition of the computing system in which the workload plan is running.

In any case, the execution issues are managed centrally by a scheduling server, which schedules the execution of the work units onto corresponding execution servers. For example, the scheduling server may provision additional execution servers (such as by allocating corresponding new virtual machines) when no execution server with the required characteristics is available to execute pending work units.

At most, each execution server may intervene locally for addressing the execution issues of the corresponding work units. For example, each execution server may add or reserve execution resources (such as processing power) to one of its work units.

Therefore, the management of the workload plan is generally static and rigid. All of the above significantly reduces the resiliency of the workload management, with the risk of missing the targets of the workload plan (and then with the above-mentioned consequences).

SUMMARY

Embodiments of the present invention provide a method, and an associated computer program product and computing system, for improving a functioning of a plurality of critical execution computing machines by reducing an impact of an execution issue on execution of a plurality of critical work units by respective critical execution computing machines. A promoted critical execution computing machine of the plurality of critical execution computing machines receive, from a scheduling computing machine, global correction information relating to the critical work units and to the critical execution computing machines, wherein the execution issue impacts execution of the critical work units by each critical execution computing machine, and wherein one critical work unit of the critical work units had been promoted by the scheduling computing machine to become a promoted critical work unit that is to be executed by the promoted critical execution computing machine. The promoted critical execution computing machine collects local correction information relating to each corresponding critical work unit and to a status of the promoted critical execution computing machine. The promoted critical execution computing machine receives peer correction information relating to the corresponding critical work units and to a corresponding status of the other critical execution computing machines. The promoted critical execution computing machine determines one or more correction actions for reducing an impact of the execution issue on the execution of the critical work units by the respective critical execution computing machines according to the global correction information, the local correction information, and the peer correction information. The promoted critical execution computing machine causes an application of the corresponding correction actions onto the critical execution computing machines, which improves a functioning of the critical execution computing machines by reducing an impact of the execution issue on the execution of the critical work units by the critical execution computing machines.

DETAILED DESCRIPTION

FIGS. 1A-1D show aspects of the present invention, in accordance with embodiments of the present invention.

Figure 1A:
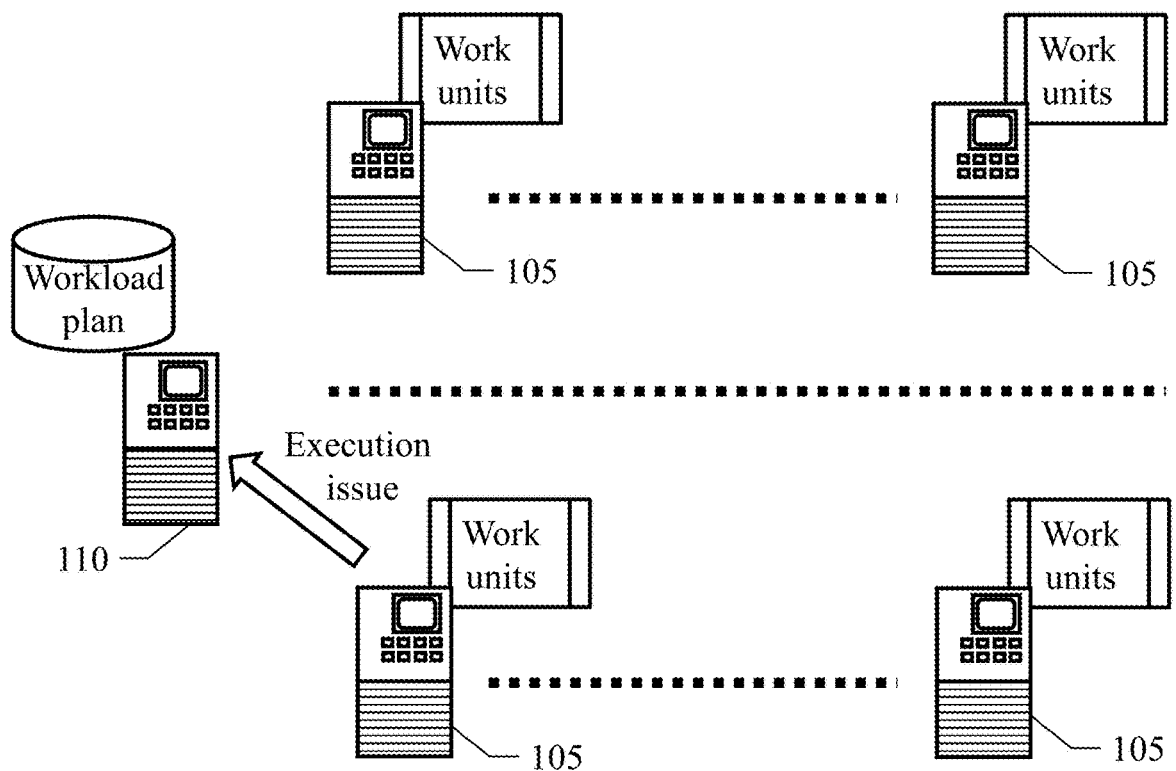
FIGS. 1A-1D show aspects of the present invention, in accordance with embodiments of the present invention.

In FIG. 1A, a plurality of execution computing machines, (for example, execution servers 105) are available to execute a plurality of work units (for example, batch jobs). A scheduling computing machine, for example, a scheduling server 110 schedules the execution of the work units onto the execution servers 105 (for example, according to a workload plan being run every day). In this context, an execution issue impacting the execution of a work unit may occur. For example, every execution server 105 monitors the execution of the execution server's work units and detects the execution issue when one of the executions is late. In response, the execution server 105 that detected the execution issue sends a notification of the execution issue to the scheduling server 110. The scope of the present invention includes embodiments in which any, mention herein of "execution server" can be replaced with "execution computing machine"

Figure 1B:
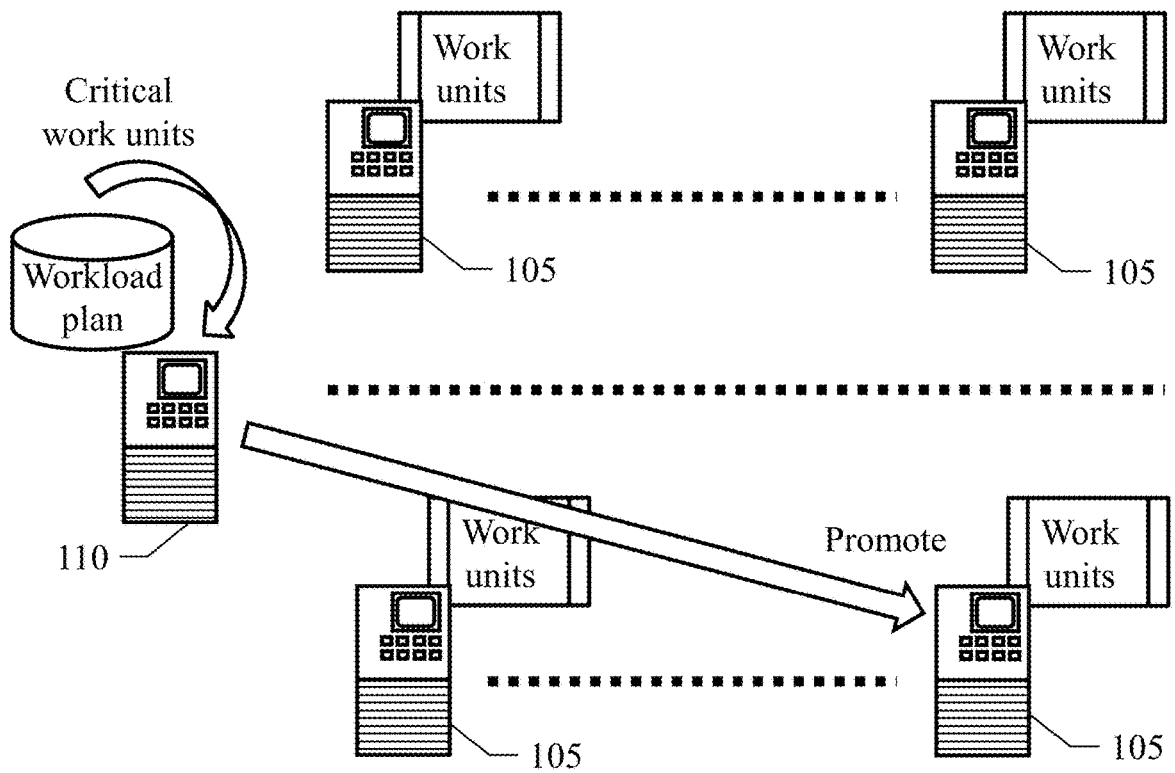

In FIG. 1B, a set of critical work units is determined (with the corresponding execution servers 105 that are hereinafter referred to as critical execution servers), the critical work units are the work units whose executions are impacted by the execution issue (for example, one work unit in which the execution issue has occurred and every other work unit depending directly or indirectly on the one work unit). One of the critical work units, referred to as promoted critical work unit, is selected (with the corresponding critical execution server 105 that executes the promoted critical work unit and is hereinafter referred to as promoted critical execution server) example, in response to the notification of the execution issue, the scheduling server 110 selects the promoted critical work unit according to predefined correction authorizations granted to the critical work units, and the scheduling server 110 sends a corresponding notification to the promoted critical execution server 105 that executes the promoted critical work unit.

Figure 1C:
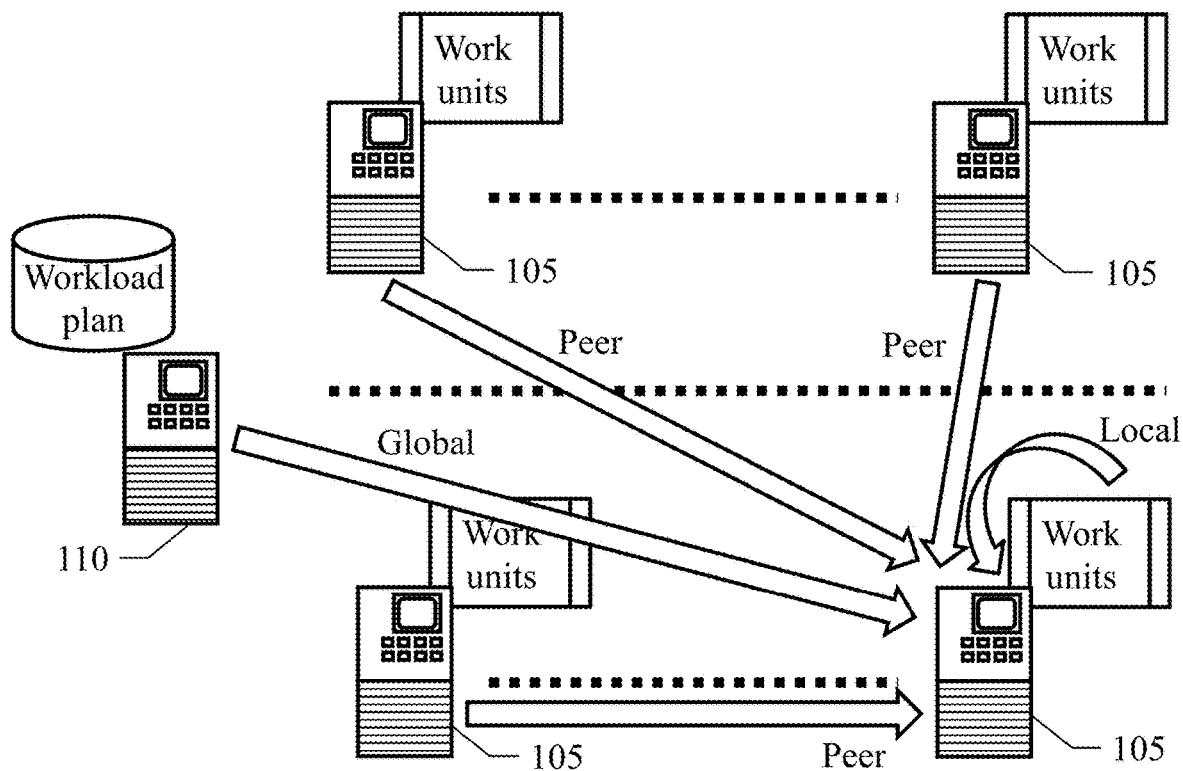

In FIG. 1C, the promoted critical cation server 105 receives global correction information from the scheduling server 110. The global correction information relates to the critical work units (for example, the list of critical work units) and to the critical execution servers 105 (for example, the list and locations of the critical execution servers 105). Moreover, the promoted critical execution server 105 collects local correction information. The local correction information relates to each corresponding critical work unit (for example, any execution issue and one or more candidate correction actions for reducing impact of the any execution issue on the execution of the critical work unit) and to a (real-time) status of the promoted critical execution server 105 (for example, currently available execution resources of the promoted critical execution server 105). The promoted critical execution server 105 also receives peer correction information from the other critical execution servers 105. The peer correction information of each other critical execution servers 105 as well relates to the corresponding critical work units and to the (real-time) status of the other critical execution servers 105.

Figure 1D:
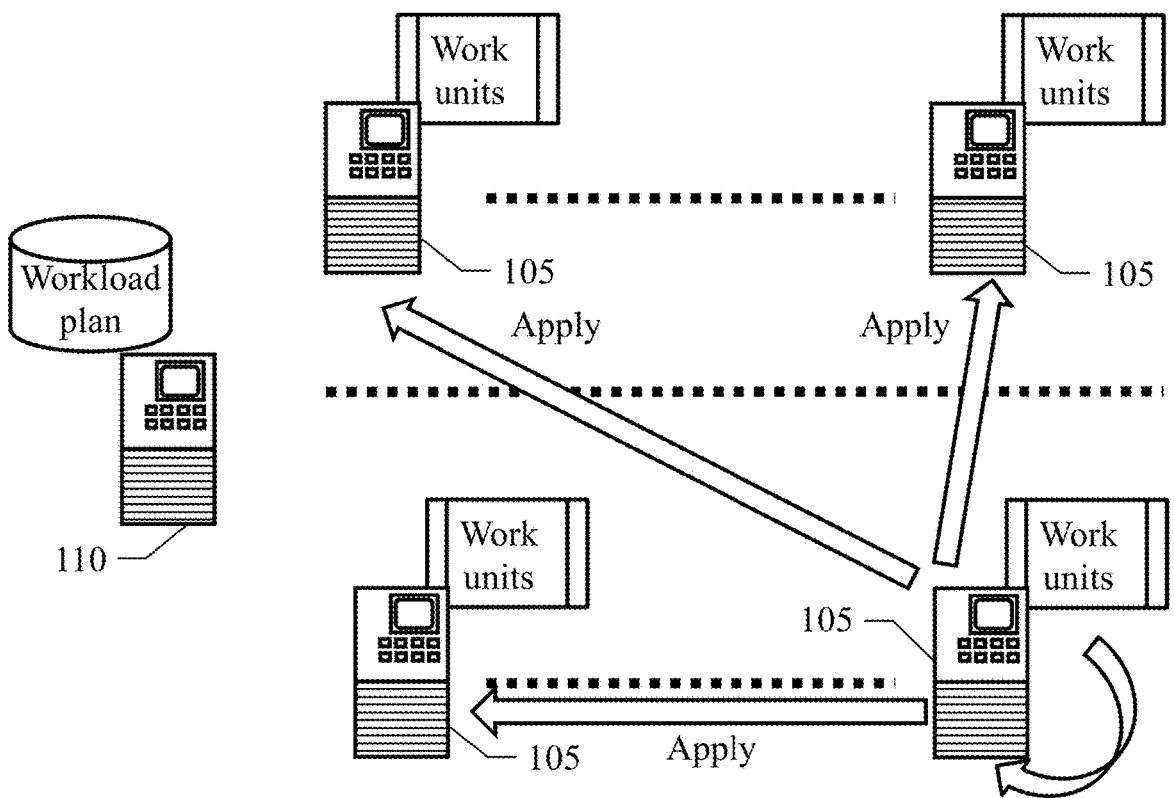

In FIG. 1D, the promoted critical execution server 105 determines one or more correction actions for reducing an impact of the execution issue on the execution of the critical work units. The correction actions are determined according to the global correction information, the local correction information and/or the peer correction information. The promoted critical execution serve 105 then causes the application of the corresponding correction actions onto the critical execution servers 105 which, for example, may involve adding/assigning execution resources, moving execution of one or more work units to one or more other execution servers 105, and/or cancelling execution steps of the critical work units.

In this way, the management of the work units is distributed among the execution servers 105. Particularly, the correction of every execution issue is delegated to the corresponding promoted critical execution server 105. The promoted critical execution server 105 then orchestrates the solution of the execution issue by causing the application of the corresponding correction actions not only on the corresponding promoted critical execution server 105 but on the other critical execution servers 105 as well.

As a result, the solution of the execution issue is dynamic (by being based on the local/peer correction information that may be collected in real-time on the critical execution servers 105) and flexible (since the solution of the execution issue is highly scalable), which significantly improves the resiliency, thereby substantially reducing the risk of missing any targets of the workload plan (for example, completion deadlines) and reducing the risk of incurring corresponding consequences (for example, business outages, payment of penalties).

Figure 2:
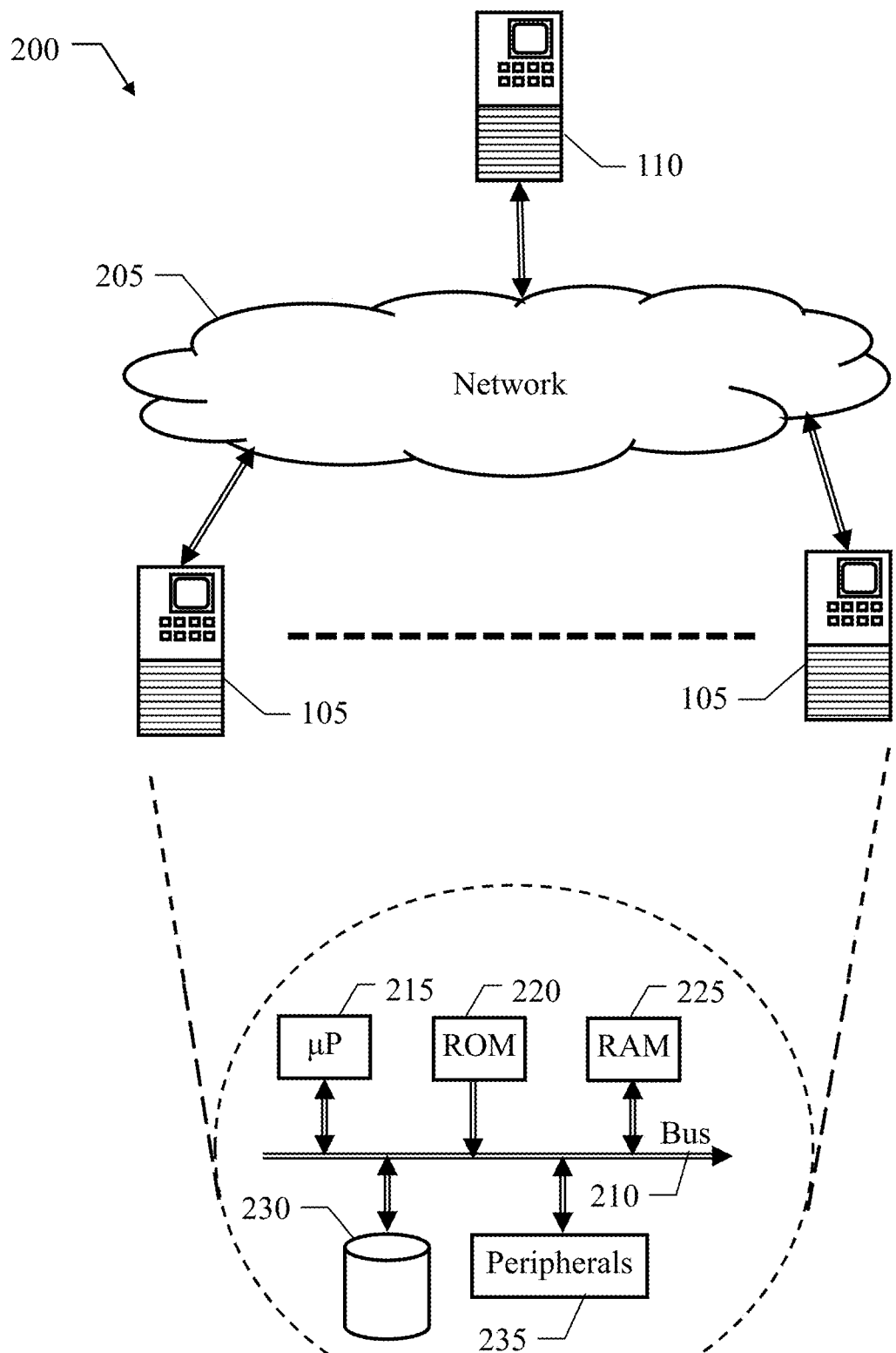
FIG. 2 shows a computing system which implements methods of the present invention.

FIG. 2 shows a computing system 200 which implements methods of the present invention.

The computing system 200 comprises the execution servers 105 and the scheduling server 110. The computing system 200 has a distributed architecture based on a communication network 205 (for example, a LAN). The execution servers 105 and the scheduling server 110 access the communication network 205 for communicating between each other or among one another.

Each of the servers 105,110 (for example, implemented in one or more server farms) comprises several units that are connected among servers 105,110 through a bus architecture 210 (with one or more levels). Particularly, one or more microprocessors (µP) 215 control operation of the server 105,110. A non-volatile memory (ROM) 220 stores basic program code for a bootstrap of the server 105,110. A volatile memory (RAM) 225 is used as a working memory by the microprocessors 215. The servers 105,110 are provided with a mass-memory 230 for storing programs and data (for example, implemented by storage devices of the corresponding server farm). Moreover, the servers 105,110 comprise a number of controllers for peripheral (or Input/Output, I/O) units 235. For example, the peripheral units 235 may comprise a network adapter for plugging the servers 105,110 into the server farm and a drive for reading/writing removable storage units (e.g., DVDs) implemented by a console of the server farm.

Figure 3:
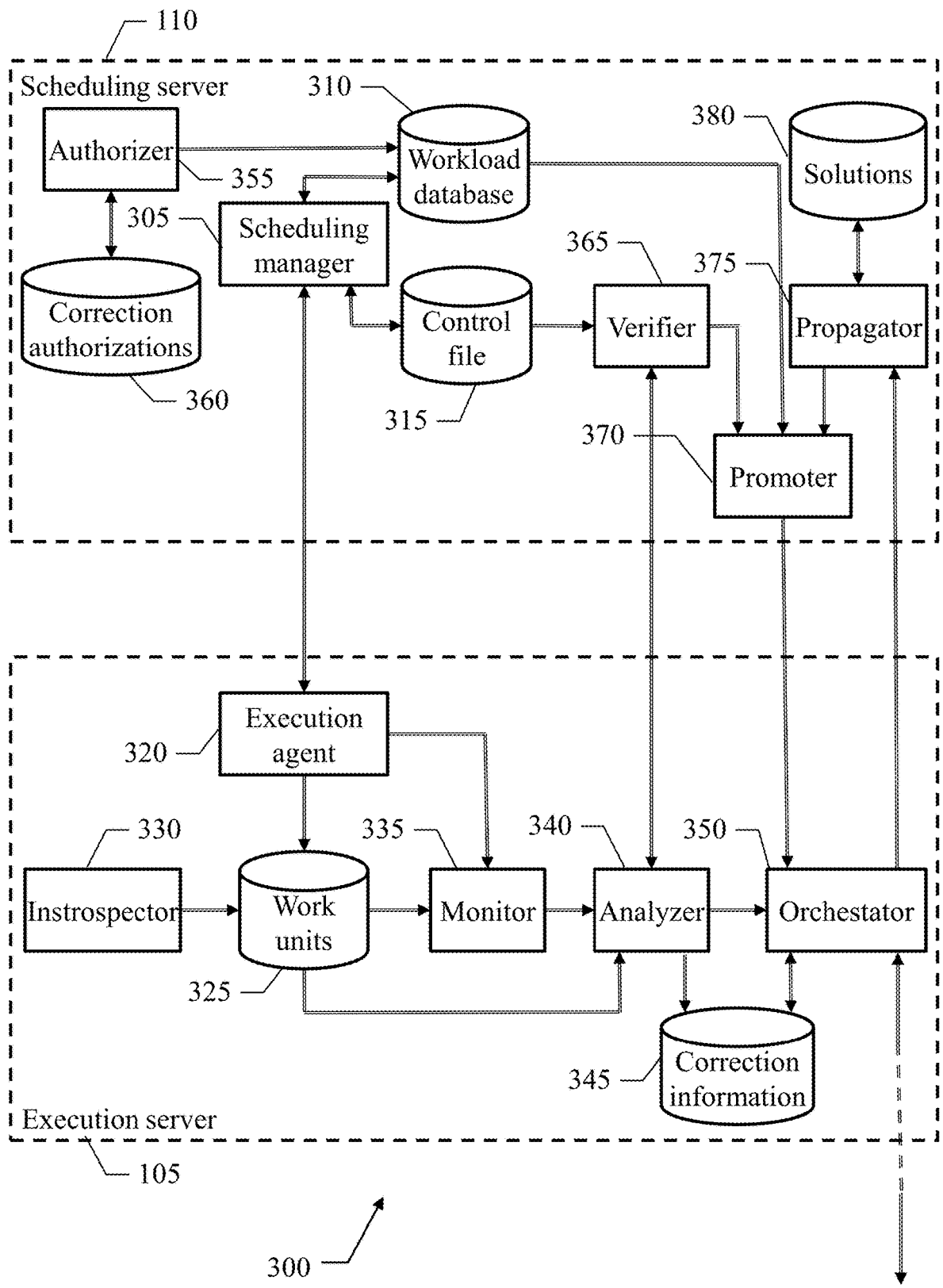
FIG. 3 shows software components used to implement methods of the present invention.

FIG. 3 shows software components used to implement methods of the present invention.

All of the software components (programs and data) are denoted as a whole with the reference 300. The software components are typically stored in the mass memory and loaded (at least partially) into the working memory of the scheduling/execution servers when the programs are running, together with an operating system and other application programs. The programs are initially installed in the mass memory, for example, from removable storage units or from the communication network. In this respect, each program may be a module, segment or portion of program code, which comprises one or more executable instructions for implementing the specified logical function.

A workload scheduler (for example, the IBM Tivoli Workload Scheduler (TWS) by IBM Corporation) manages the execution of batches of work units. The workload scheduler comprises a scheduling manager 305 that runs on the scheduling server 110 for scheduling the execution of the work units. The scheduling manager 305 accesses (in read/write mode) a workload database 310, which stores service information for controlling the execution of the work units. For example, the workload database 310 comprises a definition of each execution server 105 (such as the execution server's identifier, location, physical/logical characteristics) and a descriptor of each work unit. The descriptor of each work unit indicates a software program to be invoked for executing the work unit, how to determine the execution server wherein the work unit is to be executed (such as statically or dynamically), an execution time of the work unit (such as start time and run-cycle), any constraints for the execution of the work unit (such as preconditions, dependencies on other work units), a possible (completion) deadline for completing the execution of the work unit, historical information of previous executions of the work unit (such as results and actual durations) and expected duration (under standard conditions) for executing the work unit. The scheduling manager 305 further accesses (in read/write mode) a control file 315, which stores a current version of the workload plan. The workload plan specifies the flow of execution of the work units in a production period (for example, every day), together with the identification of the corresponding execution servers 105. Moreover, the workload scheduler comprises an execution agent 320 that runs on each execution server 105 for enforcing the execution of the corresponding work units on each execution server 105. The execution agent 320 interfaces with the scheduling manager 305 and controls the work units 325 to be executed on the execution server 105. The reference 325 indicates software programs and metadata comprising the corresponding expected durations and completion deadlines for executing the work units.

In an embodiment of the present invention, each execution server 105 runs a correction agent (for example, implemented as a plug-in of the execution agent 320) comprising the following components. An introspector 330 introspects the work units 325. For example, the introspector 330 determines a plurality of execution steps composing each work unit 325. For each execution step, the introspector 330 determines whether the execution step may be cancelled, any execution resources required for the execution step's execution (for example, hardware execution resources, such as minimum values of processing power and working memory, and software execution resources, such as running of other software programs such as DBMSs), any dependencies of the execution step (for example, on other work units) and the execution step's expected duration (under standard conditions). The introspector 330 adds this information about execution resources to the metadata of the work units 325. A monitor 335 (controlled by the execution agent 320) monitors the execution of the work units 325. An analyzer 340 (controlled by the monitor 335) determines candidate correction actions that may be applied (locally) on the execution server 105 for reducing the impact of any execution issue on the work units 325 of the execution server 105 at e level of execution steps (for example, adding/reserving execution resources, cancelling execution steps). Moreover, the analyzer 340 measures current values of the execution resources available on the execution server 105 (for example, by exploiting corresponding probes). The analyzer 340 accesses (in read mode) the metadata of the work units 325. Moreover, the analyzer 340 accesses (in write mode) a correction information repository 345, which stores the local correction information corresponding to any (pending) critical work unit thereof; for each critical work unit. The local correction information indicates candidate correction actions and the current values of the execution resources required by each execution step. An orchestrator 350 (interfacing with the orchestrator of each other execution server 105) determines the correction actions for reducing, and possibly removing, the impact of any execution issue in the execution of the corresponding critical work units and causes application of the corrective actions onto the corresponding critical execution servers 105 (every time the execution server 105 acts as the promoted critical execution server thereof). For example, the correction actions may comprise adding/reserving execution resources, moving execution of one or more work units to one or more other execution servers 105, cancelling execution steps of the critical work units. The orchestrator 350 accesses (in read/write mode) the correction information repository 345, which in this case further stores the global correction information and the peer correction information relating to the execution issue.

Moreover, the scheduling server 10 runs a correction manager (for example, implemented as a plug-in of the scheduling manager 305) comprising the following components. An authorizer 355 grants the corresponding correction authorizations to the work units. The authorizer 355 accesses (in write mode) the workload database 310 and accesses (in read/write mode) an authorization repository 360, which stores rules for granting the correction authorizations to the work units. For example, the authorization repository 360 indicates the types of correction actions that may be applied to each work unit or to all the work units of each execution server (for example, adding/reserving execution resources, moving execution of one or more work units to one or more other execution servers 105, cancelling execution steps of the critical work units). A verifier 365 (interfacing with the analyzer 340 of each execution server 105) verifies whether every execution issue impacts the execution of other work units and receives/forwards corresponding issue notifications. The analyzer 365 accesses (in read mode) the control file 315. The verifier 365 controls a promoter 370 (in turn controlling the orchestrator 345 of each execution server 105). The promoter 370 selects the promoted critical work unit for every execution issue and the promoter 370 accesses (in read mode) the workload database 310. Moreover, the promoter 370 exploits a propagator 375, which propagates (previous) correction actions that have been applied in the past for similar (affine) execution issues. The propagator 375 interfaces with the orchestrator 350 of each execution server 105 and accesses (in read/write mode) a solution repository 380, which stores information relating to the solution of previous execution issues. For each previous execution issue, the solution repository 380 indicates the critical work units, the critical execution servers and the correction actions.

Figure 4A:
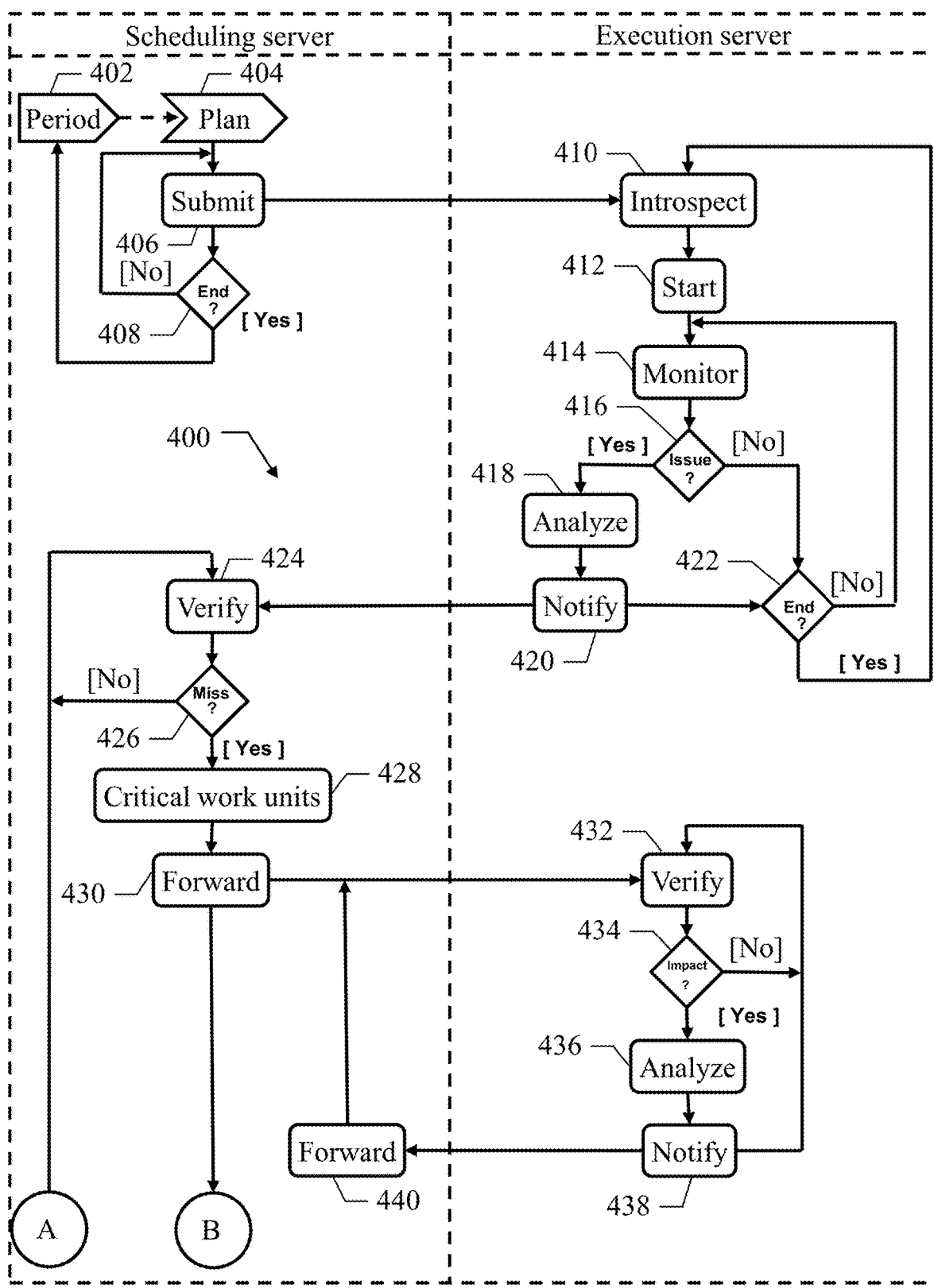
FIGS. 4A-4B show an activity diagram describing a flow of activities that implement methods of the present invention.
Figure 4B:
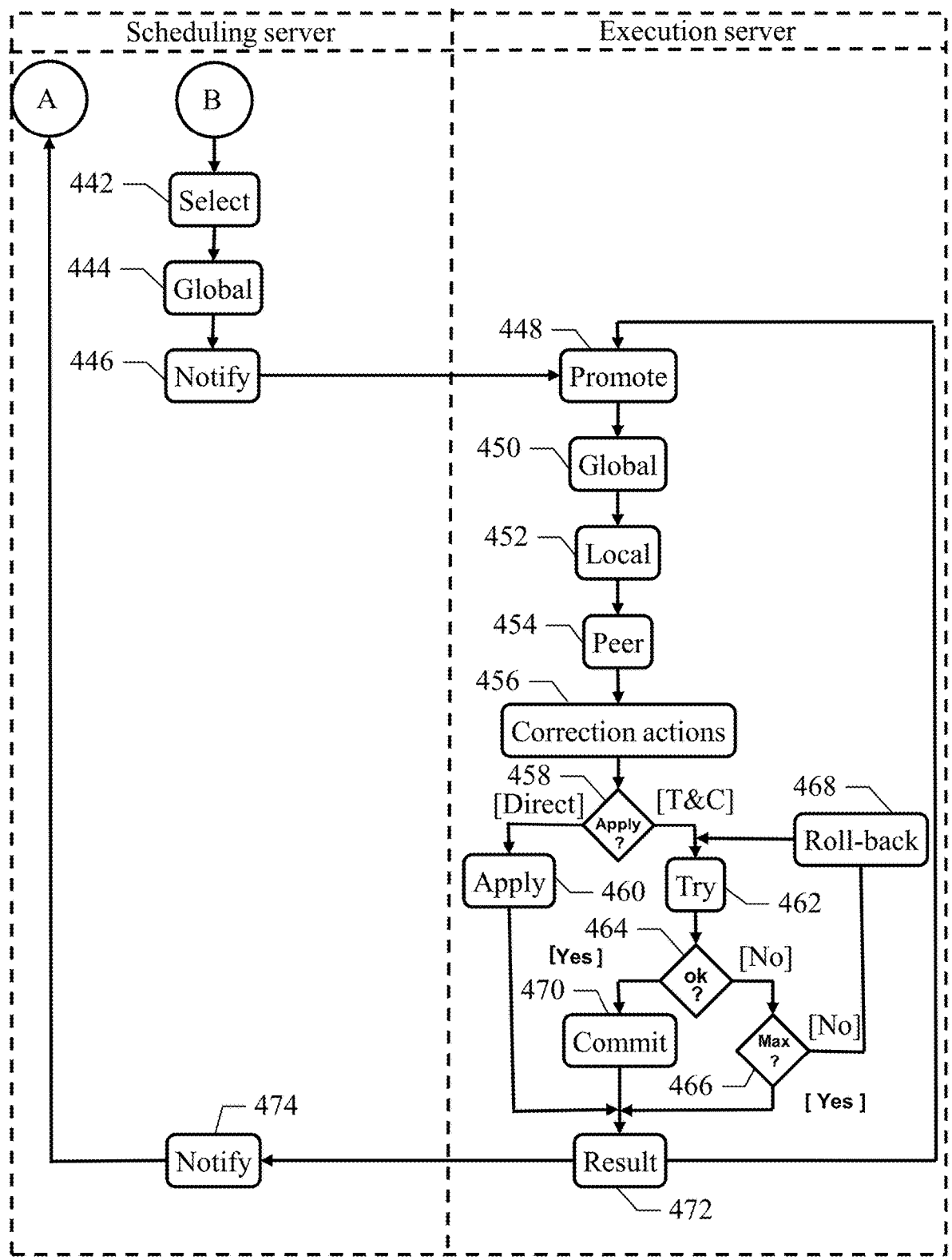

FIGS. 4A-4B shows a flow of activities that implement methods of the present invention.

FIGS. 4A-4B depicts an exemplary process that may be used to manage the execution of the work units with a method 400. In this respect, each block in FIGS. 4A-4B may correspond to one or more executable instructions for implementing the specified logical function on the corresponding scheduling/execution server.

Starting from the swim-lane of the scheduling server, the process passes from block 402 to block 404 at the beginning of every production period. In response, the scheduling manager extracts the workload plan from the control file and starts the workload plan. The flow of activity then passes to block 406 as soon as every (pending) work unit may be executed on corresponding execution server according to constraints indicated in the workload plan. In response, the authorizer determines the correction authorization of the work unit (according to the rules indicated in the authorization repository). For example, the correction authorization is the authorization indicated for the work unit if available or the authorization indicated for the execution server otherwise. The scheduling manager then submits the work unit for execution to the execution server, by passing the scheduling manager's software program with the corresponding metadata comprising the expected duration and any completion deadline (extracted from the workload database) and the correction authorization (injected by the authorizer). The scheduling manager at block 408 verifies whether the workload plan has ended (with the execution of all work units in the workload plan). If not, the process returns to the block 406 to repeat the same operations continually, with the scheduling manager that in the meanwhile receives feedback information relating to the execution of any work unit that has ended. For example, the feedback information may be a result and actual duration of execution of the work unit from the corresponding execution server and the scheduling manager adds the feedback information to the control file. Conversely, once the workload plan has ended, the process returns to the block 402 waiting for a next production period, with the scheduling manager updating the historical information and then the statistical information in the workload database according to the feedback information in the control file.

With reference now to block 410 in the swim-lane of a generic execution server, the execution agent saves any (new) work unit with the corresponding metadata as soon as the any (new) work unit is submitted for execution by the scheduling server at the block 406. The introspector then determines the execution steps of the work unit (for example, as defined by logically related operations without any intermediate dependency) and the work unit's dependencies. Moreover, for each execution step of the work unit, the introspector determines the execution resources required by the execution step and the expected duration of the execution step (for example, as a fraction of the corresponding values for the whole work unit according to a relative size of the execution step). The introspector populates the metadata of the work unit according to the required execution resources. The execution agent at block 412 starts the execution of the work unit. At the same time, the monitor at block 414 starts monitoring the execution of the work unit. The monitor at block 416 verifies whether any execution issue has occurred, which execution issue impacts (or it is likely to impact) the execution of the work unit at the level of its execution steps (according to the corresponding metadata). For example, an execution issue is detected when an execution step is longer than the execution step's expected duration (for example, by estimating a progress of the execution step according to a ratio between a measured number of predetermined operations, such as processor cycles, performed by execution step and a total number of the same operations required to complete the execution step) or when any execution resources required by an execution step are not available (for example, when any hardware execution resources fall below minimum values of the execution resources, or any software execution resources are down). If any execution issue is detected in a (critical) execution step of the (critical) work unit, the analyzer at block 418 determines the corresponding candidate correction actions (according to the metadata of the critical work unit and to a correction authorization for the corrective actions). Particularly, the analyzer determines the types of correction actions that may be applied to the critical execution step and then selects the correction actions corresponding to the execution issue (for example, adding/reserving hardware execution resources when the hardware execution resources have fallen below the corresponding minimum values, cancelling the critical execution step of the critical work units, or moving execution of one or more work units to one or more other execution servers 105). Moreover, the analyzer measures the current values of the execution resources required by the critical execution step. The analyzer then saves the local correction information (comprising these candidate correction actions and these current values of the execution resources) in association with the critical work unit to the correction information repository. The analyzer at block 420 sends a corresponding issue notification to the scheduling server. The issue notification indicates the execution issue, the critical work unit and the (critical) execution server. The process continues to block 422 which is also reached directly from the block 416 when no execution issue is detected. If the execution of the work unit is still in progress, the flow of activity returns to the block 414 to continue monitoring. Conversely, as soon as the execution of the work unit has ended, the flow of activity returns to the block 410 waiting for the submission of a next work unit.

Returning to the swim-lane of the scheduling server, the verifier receives the issue notification from any execution server at block 424. In response, the verifier determines an impact of the execution issue on the workload plan. For example, the verifier determines whether the execution issue causes (or is likely to cause) the missing of any targets of the workload plan (such as completion deadlines). The flow of activity branches at block 426 according to a result of this verification. Particularly, if the execution issue does not cause the missing of any target, the process directly returns to the block 424 waiting for a next issue notification. Conversely, the verifier at block 428 determines the (critical) work units, and the corresponding (critical) execution servers pertaining to the critical work units which are impacted by the execution issue; i.e., the (first) critical work unit on the (first) critical execution server wherein the execution issue has occurred and the other (second) critical work units on the corresponding (second) critical execution servers (for example, depending directly or indirectly on the first critical work unit as indicated in the control file). The verifier at block 430 forwards the issue notification to all the second critical execution servers.

Every (second) execution server receives any issue notification at block 432 in the corresponding execution server swim-lane. In response, the analyzer verifies whether the execution issue impacts (or it is likely to impact) the execution of (pending) work units of the second execution server. For example, a (further) execution issue is detected when an execution step of these work units depends on the first critical work unit. The flow of activity branches at block 434 according to a result of this verification. Particularly, if the execution issue does not impact any work unit of the second execution server, the process returns to the block 432 waiting for a next issue notification. Conversely, as soon as any further execution issue is detected in a (second critical) execution step of a (second) critical work unit, the analyzer at block 436 determines the corresponding (second) candidate correction actions as above. In any case, the analyzer measures the current values of the execution resources required by critical work units of the second execution server. The analyzer then saves the local correction information (comprising these possible candidate correction actions and these current values of the execution resources) in association with the critical work units into the correction information repository. The analyzer at block 438 sends a corresponding (further) issue notification to the scheduling server. This issue notification indicates the execution issue, the critical work unit and the critical execution server. The process then returns to the block 432 waiting for a next issue notification. Returning to the swim-lane of the scheduling server, the verifier receives the issue notification from any second critical execution server at block 440. In response, the verifier forwards the issue notification to the other critical execution servers (so as to reiterate the same operations described above).

At the same time, in the swim-lane of the scheduling server the flow of activity passes from the block 430 to block 442 in FIG. 4B, wherein the promoter selects one critical work unit of the critical work units as promoted critical work unit (for example, according to correction authorizations and to the locations of the corresponding critical execution servers indicated in the workload database, such as in decreasing order of types of correction actions that may be applied and then of distance from the other critical execution servers). The promoted critical execution server is the critical execution server that executes the promoted critical work unit. Thus, the selection, by the promoter, of the promoted critical work unit is also a selection of the promoted critical execution server. The promoter at block 444 collects the global correction information relating to the execution issue. For example, the global correction information indicates the critical work units and the critical execution servers (received from the verifier) and the locations of the critical execution servers (extracted from the workload database). Moreover, the global correction information may comprise one or more suggested correction actions. The suggested correction actions are the correction actions that have already been applied to similar situations, and that are likely to be effective in the current situation too, as determined by the propagator. For example, the suggested correction actions are derived from a similar execution issue, such as of the same type, in the same or similar critical work units (such as performing the same type of operations). The promoter at block 446 sends a corresponding promotion notification (comprising the global correction information) to the (promoted) critical execution server of the promoted critical work unit.

The promoted critical execution server (i.e., the execution server depicted in FIG. 4B) receives, from the scheduling server, the promotion notification at block 448 in the corresponding swim-lane of the execution server. In response, the orchestrator at block 450 receives and saves the global correction information into the correction information repository. The orchestrator at block 452 retrieves the local correction information of the critical work unit from the correction information repository. The orchestrator at block 454 collects the peer correction information and saves the peer correction information into the correction information repository. For this purpose, the orchestrator sends a corresponding request for each of the other critical work units to the corresponding (other) critical execution server (as indicated in the promotion notification). In response, the orchestrator of each other critical execution server retrieves the local correction information of the corresponding critical work unit from the orchestrator's correction information repository and returns the local correction information of the corresponding critical work unit to the promoted critical execution server. The orchestrator at block 456 determines the correction actions for reducing the impact of the execution issue, according to the global correction information (comprising the suggested correction actions in one embodiment), the local correction information and the peer correction information. For example, the orchestrator at first selects the suggested correction actions and then the candidate correction actions that may be applied locally on the critical execution servers, comprising reserving execution resources and then adding execution resources. In one embodiment, the orchestrator selects the moving execution of one or more critical work units to one or more other critical execution servers selected according to the current values of execution resources of the critical execution servers and to locations of the critical execution servers, and in embodiments, the orchestrator selects the cancellation of one or more critical execution steps and then the cancellation of entire critical work units.

The flow of activity now branches at block 458 according to a mode of application of the correction actions (for example, selected as a configuration parameter of the promoter and then indicated in the promotion notification). Particularly, if the correction actions are to be applied in a direct mode, the orchestrator at block 460 causes the application thereof onto the corresponding critical execution servers. Particularly, the orchestrator applies the corresponding correction actions onto the promoted critical execution server. The orchestrator instead sends corresponding commands to the other critical execution servers (indicating the correction actions to be applied thereon), so as to cause the orchestrator of each other critical execution server to apply the correction actions indicated therein as well. Referring back to the bock 458, if the correction actions are instead to be applied in a trial and commit (T&C) mode, the orchestrator at block 462 tries to apply the correction actions. Particularly, the orchestrator applies the corresponding correction actions onto the promoted critical execution server by saving an indication of the corresponding changes into a transaction log (continuing the execution of the critical execution server's critical work units at most up to the completion of the current execution step). The orchestrator instead sends corresponding commands to the other critical execution servers (indicating the correction actions to be applied thereon), so as to cause the orchestrator of each other critical execution server to apply the correction actions indicated therein by saving an indication of the corresponding changes into a transaction log as well (continuing the execution of the critical execution server's critical work units at most up to the completion of the current execution step). The process continues at block 464 as soon as all the correction actions have been applied (as known directly to the orchestrator of the promoted critical execution server for the critical execution server's correction actions and indicated in corresponding notifications received from the corresponding orchestrators for the correction actions of the other critical execution servers). At this point, the orchestrator verifies a result of the application of the correction actions. Particularly, the orchestrator verifies (with the monitor) the execution of the corresponding execution steps. The orchestrator instead sends corresponding commands to the other critical execution servers, so as to cause the orchestrator of each other critical execution server to verify (with the monitor) the execution of the corresponding execution steps and to return the result of the execution of the corresponding correction actions. If a trend of the execution of the critical work units indicates that the correction actions are likely to be ineffective in removing the execution issue, the orchestrator at block 466 verifies whether a maximum number of attempts to solve the execution issue have been performed (for example, 3-5). If not, the orchestrator at block 468 rollbacks the application of the correction actions. Particularly, the orchestrator reverses the changes indicated in the transaction log and then purges the changes on the promoted critical execution server. The orchestrator instead sends corresponding commands to the other critical execution servers, so as to cause the orchestrator of each other critical execution server to reverse the changes indicated in the transaction log and then to purge the changes. The flow of activity then returns to the block 462 to determine different correction actions (in decreasing order of preference) and then to try their application as above. Referring back to the block 464, if the trend of the execution of the critical work units indicates that the correction actions are likely to be effective in removing the execution issue, the orchestrator at block 470 commits application of the correction actions. Particularly, the orchestrator purges the transaction log and restarts the execution of the critical work units (if necessary) on the promoted critical execution server. Instead, the orchestrator sends corresponding commands to the other critical execution servers so as to cause the orchestrator of each other critical execution server to purge the transaction log and to restart the execution of the critical work units in one embodiment.

The flow of activity merges again at block 472 from the block 460, from the block 470 or from the block 466 when the maximum number of attempts to solve the execution issue have been reached without removing the execution issue (after the rollback). In any case, as soon as the current execution steps of all the critical work units have been completed, the orchestrator determines the (actual) result of the application of the correction actions as above. The orchestrator then returns a correction notification to the scheduling server. The correction notification comprises an indication of the correction actions and the result of the application of the correction actions (in association with the execution issue). The process then returns to the block 448 waiting for a next promotion notification. The propagator receives the correction notification at block 474 in the swim-lane of the scheduling server. In response, if the correction notification indicates that the execution issue has been solved, the propagator adds a corresponding record to the solution repository, indicating the execution issue (extracted from the correction notification), the critical work units and the critical execution servers (received from the promoter) and the correction actions (extracted from the correction notification). The process then returns to the block 424 waiting for a next issue notification. Thus implementation of the corrective actions improves the functioning of each critical execution server in which the execution issue has been solved.

In one embodiment, one or more methods of the present invention are performed in real time so as to reduce the impact of the execution issue on the execution of the critical work units by the critical execution computing machines in a minimal amount of time.

In order to satisfy local and specific requirements, a person skilled in the art may apply many logical and/or physical modifications and alterations to the present disclosure. More specifically, although this invention has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method execution steps described in connection with any embodiment of the present invention may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing execution of work units in a computing system. However, the work units may be in any number and of any type (i.e., any activities suitable to be executed on any computing system, either in batch or in real-time mode, such as jobs, scripts, job streams) and execution of the work units may be managed in any way (for example, under the control of any workload scheduler, such as implemented by a classic software product or provided as a cloud service, according to any workload plan, such as changing every production period or repeated the same continually).

In an embodiment, the computing system comprises a plurality of execution computing machines (for executing the work units) and at least one scheduling computing machine (for scheduling the execution of the work units). However, the computing system may be of any type, with any number and type of execution computing machines and scheduling computing machines (see below).

In an embodiment, the method comprises promoting one of a set of critical work units (to be executed on corresponding critical ones of the execution computing machines) to a promoted critical work unit. However, the promoted critical work unit may be determined in any way (for example, according to the execution issues of the critical work units, the correction authorizations for the execution issues, the current status of the corresponding critical execution computing machines, any different, additional, alternative criteria or any combination thereof), even generically at the level of the execution computing machines.

In an embodiment, the critical work units are the work units whose execution is impacted by an execution issue in the execution of at least one work unit. However, the execution issue may be of any type (for example, an actual delay or failure of a work unit that is measured, an estimated delay of a work unit that is forecast according to the progress of its execution or according to the status of the corresponding execution computing machine) and the execution issue may impact the execution of the critical work units in any way (for example, because the execution issue causes or it is likely to cause a delay or a failure in the execution of the work units, with the delay that causes the missing of any target or simply exceeds a threshold). Moreover, the execution issue may be detected in any way and the critical work units may be determined in any way (for example, locally, centrally or any combination thereof).

In an embodiment, the method comprises receiving global correction information relating to the critical work units and to the critical execution computing machines from the scheduling computing machine. However, the global correction information may be of any type, relating in any way to the critical work units (for example, identifying the critical work units, the dependencies of the critical work units, completion deadlines) and to the critical execution computing machines (for example, identifying the critical work units, the locations of the critical work units, static hardware/software resources, connections). Moreover, the global correction information may be received in any way (for example, sent together with the promotion notification or made available for their downloading in response thereto).

In an embodiment, the global correction information is received by a promoted critical execution computing machine (of the critical execution computing machines wherein the promoted critical work unit is to be executed). However, the promoted critical execution computing machine may be selected in any way (for example, locally or centrally).

In an embodiment, the method comprises collecting local correction information relating to each corresponding critical work unit and to a status of the promoted critical execution computing machine by the promoted critical execution computing machine. However, the local correction information may be of any type, relating in any way to the corresponding critical work unit (for example, indicating its execution issue, candidate correction actions, structure) and to the promoted critical execution computing machine (for example, its status with respect to any number and type of hardware/software resources thereof, any number and type of Performance Key indicators, PKIs, thereof). Moreover, the local correction information may be collected in any way (for example, in response to the detection of any corresponding execution issue or in response to the promotion notification).

In an embodiment, the method comprises receiving peer correction information relating to the corresponding critical work units and to the corresponding status of the other critical execution computing machines by the promoted critical execution computing machine. However, the peer correction information may be of any type, relating in any way to the corresponding critical work units and to the corresponding critical execution computing machines (either the same or different with respect to the local correction information). Moreover, the peer correction information may be received in any way (for example, in response to a corresponding request or published by the execution servers into a shared repository for downloading).

In an embodiment, the method comprises determining one or more correction actions for reducing an impact of the execution issue on the execution of the critical work units. However, the correction actions may be in any number and of any type (for example, reserving execution resources, adding execution resources, moving one or more critical work units to one or more other execution servers, cancelling execution steps of the critical work units or of entire critical work units, any combination thereof) for reducing the impact of the execution issue in any way (for example, removing the execution issue, reducing the delay below a threshold). Moreover, the correction actions may be determined in any way (for example, completely on the promoted critical execution computing machine or in part on the other critical execution computing machines).

In an embodiment, the correction actions are determined according to the global correction information, the local correction information and the peer correction information by the promoted critical execution computing machine. However, the correction actions may be determined in any way (for example, according to any rules based on any criteria) and with any technique (for example, based on deterministic, fuzzy or artificial intelligence logic).

In an embodiment, the method comprises causing an application of the corresponding correction actions onto the critical execution computing machines by the promoted critical execution computing machine. However, the correction actions may be applied in any way (for example, automatically or after a manual confirmation).

In an embodiment, the method comprises monitoring the execution of the corresponding work units by the execution computing machines for detecting the execution issue in the execution of a first critical work unit of the critical work units (by a first critical execution computing machine of the critical execution computing machines). However, the execution of the work units may be monitored in any way (for example, by verifying whether the execution of each work unit is in progress, how execution of each work unit proceeds at the level of each work unit's execution steps or of the whole work unit).

In an embodiment, the method comprises sending a notification of the execution issue, in response to the detecting of the execution issue, to the scheduling computing machine by the first critical execution computing machine. However, the execution issue may be notified in any way (for example, in push or pull mode) by conveying any information relating to the execution issue (for example, the type of execution issue, an amount of the corresponding delay, the critical work unit, the execution issue's critical execution step).

In an embodiment, the method comprises determining the critical work units corresponding to the first critical work unit in response to the notification of the execution issue by the scheduling computing machine. However, the critical work units may be determined in any way (for example, directly or by collecting corresponding information from the execution computing machines).

In an embodiment, the method comprises selecting the promoted critical work unit among the critical work units by the scheduling computing machine. However, the promoted critical work units may be selected in any way (for example, directly or by collecting corresponding information from the critical execution computing machines).

In an embodiment, the method comprises notifying the selecting of the promoted critical work unit to the promoted critical execution computing machine by the scheduling computing machine. However, the promotion of the critical work unit may be notified in any way (for example, in push or pull mode) by conveying any information relating thereof (for example, the promotion with the global correction information, the promotion only).

In an embodiment, the method comprises determining one or more first candidate correction actions for reducing the execution issue of the first critical work unit by the first critical execution computing machine. However, the first candidate correction actions may be in any number and of any type (see above) and the first candidate correction actions may be determined at any time (for example, as soon as the execution issue is detected or in response to a corresponding request).

In an embodiment, the method comprises collecting the local correction information (comprising the first candidate correction actions) by the promoted critical execution computing machine when equal to the first critical execution computing machine, or sending the peer correction information (comprising the first candidate correction actions) from the first critical execution computing machine to the promoted critical execution computing machine otherwise. However, the local correction information may be collected in any way (for example, retrieving the local correction information when already available or determining the local correction information at the moment) and the peer correction information may be sent in any way (for example, in push or pull mode).

In an embodiment, the method comprises verifying second one or more of the critical work units different from the first critical work unit by corresponding second execution computing machines of the critical execution computing machines for detecting corresponding further execution issues in the execution of the second critical work units caused by the execution issue. However, the further execution issues may be of any type (either the same as or different from the execution issue) and may be detected in any way (for example, locally or centrally, either directly or by collecting corresponding information from the execution computing machines).

In an embodiment, the method comprises determining one or more second candidate correction actions for reducing each of the further execution issues by the corresponding second critical execution computing machine. However, the second candidate correction actions may be in any number and of any type (either the same as or different from the first candidate correction actions) and may be determined at any time (for example, as soon as the further execution issue is detected or in response to a corresponding request).

In an embodiment, the method comprises collecting the local correction information (comprising the second candidate correction actions) by the promoted critical execution computing machine when equal to one of the second critical execution computing machines, or sending the peer correction information (comprising the second candidate correction actions) from each of the second critical execution computing machines to the promoted critical execution computing machine otherwise. However, the local correction information may be collected in any way and the peer correction information may be sent in any way (either the same as or different from above).

In an embodiment, the method comprises forwarding notification of the execution issue to the second critical execution computing machines by the scheduling computing machine. However, the notification of the execution issue may be forwarded in any way (for example, through the scheduling execution server or directly by the first critical execution server) or may be omitted.

In an embodiment, the method comprises verifying the corresponding second critical work units in response to the notification of the execution issue (for detecting the corresponding further execution issues) by the corresponding second critical execution computing machines. However, the verification of the second critical work units may be performed at any time (for example, in response to the notification of the execution issue or upon request by the orchestrator of the promoted critical execution server).

In an embodiment, the method comprises determining a plurality of execution steps composing each of the work units by the corresponding execution computing machine. However, the execution steps may in any number and of any type (for example, defined according to logically related operations, invocation of modules) and the execution steps may be determined in any way (for example, by the execution computing machines or by the scheduling computing machine).

In an embodiment, the method comprises monitoring the execution of each of the execution steps of each corresponding work unit by each of the execution computing machines for detecting the execution issue in the execution of a first critical one of the execution steps of the first critical work unit. However, the execution issue may be detected in any way (for example, according to the number of any type of executed operations, to any intermediate results), with the possibility of detecting the execution issue at the level of the entire first critical work unit that is not excluded.

In an embodiment, the method comprises verifying each of the execution steps of the second critical work units by the corresponding second critical execution computing machines for detecting the corresponding further execution issues in the execution of corresponding second critical execution steps of the execution steps of the second critical work units. However, the execution steps of the second critical work unit may be verified in any way (for example, when the execution steps depend on the first critical work unit directly or indirectly, with or without the sending and forwarding of a corresponding notification for reiterating the process), with the possibility of verifying the execution steps of the second critical work unit at the level of the entire second critical work units that is not excluded.

In an embodiment, the method comprises determining the first candidate correction actions for reducing the execution issue of the first critical execution step by the first critical execution computing machine. However, the first candidate correction actions may be determined in any way (see above), with the possibility of determining the first candidate correction actions at the level of the entire first critical work unit that is not excluded.

In an embodiment, the method comprises determining the second candidate correction actions for reducing each of the further execution issues of the corresponding second critical execution step by the corresponding second critical execution computing machine. However, the second candidate correction actions may be determined in any way (see above), with the possibility of determining the second candidate correction actions at the level of the entire second critical work units that is not excluded.

In an embodiment, the method comprises associating corresponding correction authorizations with the work units. However, the correction authorizations may be of any type (for example, each defined by any number of types of correction actions) and the correction authorizations may be determined in any way (for example, individually or at the level of the execution computing machines or groups thereof). In any case, the possibility of defining a same correction authorization globally for all the work units is not excluded.

In an embodiment, the method comprises determining the first candidate correction actions according to the corresponding correction authorization by the first critical execution computing machine. However, the first candidate correction actions may be authorized in any way (for example, by the first critical execution computing machine or by the promoted critical execution computing machine). More generally, the possibility is not excluded of authorizing the first correction actions at any level (for example, at the level of the first candidate correction actions) and in any way (for example, according to the corresponding correction authorization, manually or even indiscriminately).

In an embodiment, the method comprises determining the corresponding second candidate correction actions according to the corresponding correction authorizations by the second critical execution computing machines. However, the second candidate correction actions may be authorized in any way, with the possibility that is not excluded of authorizing the second correction actions at any level and in any way (either the same as or different from the first correction actions).

In an embodiment, the method comprises submitting each of the work units for execution to the corresponding execution computing machine in association with the corresponding correction authorization by the scheduling computing machine. However, the correction authorizations may be associated with the work units in any way (for example, by sending the he correction authorizations to the execution computing machines at any time or by publishing them for their downloading).

In an embodiment, the method comprises selecting the promoted critical work unit according to the correction authorizations of the critical work units. However, the promoted critical work unit may be selected in any way according to the correction authorizations (for example, according to weights assigned to predefined types thereof, or more generally according to different, additional or alternative criteria).

In an embodiment, the step of causing the application of the corresponding correction actions comprises applying the correction actions in a trial mode. However, the correction actions may be applied in the trial mode in any way (for example, by saving the changes associated with the corrective actions into a transaction log for each critical execution computing machine or into a common transaction log, by saving a snapshot of each critical execution computing machine before the application of the corresponding correction actions). In any case, the possibility is not excluded of supporting any number and type of mode of application of the correction actions (for example, only the direct mode, only the trial and commit mode, both of the direct mode and the trial and commit mode selected in any way either statically or dynamically).

In an embodiment, the step of causing the application of the corresponding correction actions comprises verifying a result of the application of the correction actions. However, the result of the application of the correction action may be verified in any way (for example, according to a progress of the critical work units or waiting for the completion of the critical work units or of the current execution steps).

In an embodiment, the step of causing the application of the corresponding correction actions comprises rolling-back or committing the application of the correction actions according to the result of the application of the corresponding correction actions. However, the application of the correction actions may be rolled-back and committed in any way (for example, by reversing the changes in the transaction logs, restoring the snapshots and by purging the transactions log, deleting the snapshots, respectively). Moreover, the choice of the operation to be performed may be determined in any way (for example, by committing the application of the correction actions when it is likely to remove the execution issue with a probability higher than a threshold probability value, when it is likely to reduce the execution issue below a threshold (indiscriminately or with a probability higher than a threshold probability value), when the correction actions actually removed/reduced the execution issue).

In an embodiment, the method comprises sending a correction notification comprising an indication of the correction actions and of a result of the application thereof to the scheduling computing machine by the promoted critical execution computing machine. However, the correction notification Wray be sent in any way (for example, in push or pull mode) and the result of the application of the correction actions may be indicated in any way (for example, success/failure, amount of reduction of a delay).

In an embodiment, the method comprises determining one or more suggested correction actions for reducing the impact of the execution issue according to the correction notification of one or more previous iterations of the method. However, the suggested correction actions may be determined according to the correction notification of any number of previous iterations of the method and in any way (for example, weighting the previous iterations according to the result, age).

In an embodiment, the method comprises sending an indication of the suggested correction actions to the promoted critical execution computing machine by the scheduling computing machine. However, the suggested correction actions may be sent in any way (for example, together with the promotion notification or made available for their downloading).

In an embodiment, the method comprises determining the correction actions further according to the suggested correction actions by the promoted critical execution computing machine. However, the correction actions may be determined in any way (for example, according to a weight assigned to each set of suggested correction actions according to the results from previous usage of the suggested correction actions, number of applications). In any case, this feature is merely optional and may be omitted in a simplified implementation.

Generally, similar considerations apply if the same solution is implemented with an equivalent method (by using similar execution steps with the same functions of more execution steps or portions thereof, removing some execution steps being non-essential, or adding further optional execution steps). Moreover, the execution steps may be performed in a different order, concurrently or in an interleaved way (at least in part).

An embodiment provides a computer program configured for causing a computing system perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (for example, the workload scheduler) or even directly in the latter. Moreover, the computer program may run on any computing system (see below). In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the execution steps of the above-mentioned method. An embodiment provides a system comprising a circuitry (i.e., any hardware suitably configured, for example, by software) configured for performing each of the execution steps of the same method. However, the computing system may comprise any number and type of scheduling/execution computing machines (for example, of physical and/or virtual type) and it may have any architecture (stand-alone or distributed with the computing machines communicating with each other via any local, wide area, global, cellular or satellite network and exploiting any type of wired and/or wireless connections).

Generally, similar considerations apply if the system has a different structure or comprises equivalent components or has other operative characteristics. In any case, every component thereof may be separated into more elements, or two or more components may be combined together into a single element. Moreover, each component may be replicated to support the execution of the corresponding operations in parallel. Moreover, unless specified otherwise, any interactivity between different components generally does not need to be continuous, and may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PIA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computing system to implement the methods of the present invention.

A computing system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for improving a functioning of a plurality of critical execution computing machines, said method comprising:

determining, by a promoted critical execution computing machine of the plurality of critical execution computing machines, one or more correction actions for reducing an impact of an execution issue on execution of a plurality of critical work units by respective critical execution computing machines on the execution of the critical work units by the respective critical execution computing machines according to global correction information, local correction information, and peer correction information, wherein the global correction information had been received from a scheduling computing machine and relates to the critical work units and to the critical execution computing machines, wherein the local correction information relates to each corresponding critical work unit and to a status of the promoted critical execution computing machine, and wherein the peer correction information relates to the corresponding critical work units and to a corresponding status of the other critical execution computing machines; and causing, by the promoted critical execution computing machine, an application of the corresponding correction actions onto the critical execution computing machines, which improves a functioning of the critical execution computing machines by reducing an impact of the execution issue on the execution of the critical work units by the critical execution computing machines.

2. The method of claim 1, wherein one critical work unit of the critical work units had been promoted by the scheduling computing machine to become a promoted critical work unit that is to be executed by the promoted critical execution computing machine.

3. The method of claim 1, wherein the method comprises:

monitoring the execution of the corresponding work units by the execution comp machines for detecting the execution issue in the execution of a first one of the critical work units by a first one of the critical execution computing machines, sending a notification of the execution issue in response to the detecting thereof to the scheduling computing machine by the first critical execution computing machine, determining the critical work units corresponding to the first critical work unit in response to the notification of the execution issue by the scheduling computing machine, selecting the promoted critical work unit among the critical work units by the scheduling computing machine, and notifying the selecting of the promoted critical work unit to the promoted critical execution computing machine by the scheduling computing machine.

4. The method of claim 3, wherein the method comprises:

determining one or more first candidate correction actions for reducing the execution issue of the first critical work unit by the first critical execution computing machine, collecting the local correction information comprising the first candidate correction actions by the promoted critical execution computing machine when equal to the first critical execution computing machine or sending the peer correction information comprising the first candidate correction actions from the first critical execution computing machine to the promoted critical execution computing machine otherwise.

5. The method of claim 4, wherein the method comprises:

verifying second one or more of the critical work units different from the first critical work unit by corresponding second ones of the critical execution computing machines for detecting corresponding further execution issues in the execution of the second critical work units caused by the execution issue, determining one or more second candidate correction actions for reducing each of the further execution issues by the corresponding second critical execution computing machine, and collecting the local correction information comprising the second candidate correction actions by the promoted critical execution computing machine when equal to one of the second critical execution computing machines or sending the peer correction information comprising the second candidate correction actions from each of the second critical execution computing machines to the promoted critical execution computing machine otherwise.

6. The method of claim 5, wherein the method comprises:
forwarding the notification of the execution issue to the second critical execution computing machines by the scheduling computing machine, and
verifying the corresponding second critical work units in response to the notification of the execution issue for detecting the corresponding further execution issues by the second critical execution computing machines.

7. The method of claim 5, wherein the method comprises:
determining a plurality of execution steps composing each of the work units by the corresponding execution computing machine,
monitoring the execution of each of the execution steps of each corresponding work unit by each of the execution computing machines for detecting the execution issue in the execution of a first critical one of the execution steps of the first critical work unit, and
verifying each of the execution steps of the second critical work units by the corresponding second critical execution computing machines for detecting the corresponding further execution issues in the execution of corresponding second critical ones of the execution steps of the second critical work units.

8. The method of claim 7, wherein the method comprises:
determining the first candidate correction actions for reducing the execution issue of the first critical execution step by the first critical execution computing chine, and
determining the second candidate correction actions for reducing each of the further execution issues of the corresponding second critical execution step by the corresponding second critical execution computing machine.

9. The method of claim 1, wherein the method comprises:
associating corresponding correction authorizations with the work units,
determining the first candidate correction actions according to the corresponding correction authorization by the first critical execution computing machine, and
determining the corresponding second candidate correction actions according to the corresponding correction authorizations by the second critical execution computing machines.

10. The method of claim 9, wherein the method comprises:
submitting each of the work units for execution to the corresponding execution computing machine in association with the corresponding correction authorization by the scheduling computing machine.

11. The method of claim 1, wherein said causing the application of the corresponding correction actions comprises:
applying the correction actions in a trial mode,
verifying a result of the application of the correction actions, and
rolling-back or committing the application of the correction actions according to the result thereof.

12. The method of claim 1, wherein the method comprises:
sending a correction notification comprising an indication of the correction actions and of a result of the application thereof to the scheduling computing machine by the promoted critical execution computing machine,
determining one or more suggested correction actions for reducing the impact of the execution issue according to the correction notification of one or more previous iterations of the method,
sending an indication of the suggested correction actions to the promoted critical execution computing machine by the scheduling computing machine, and
determining the correction actions further according to the suggested correction actions by promoted critical execution computing machine.

13. The method of claim 1, wherein the one or more correction actions include one or more actions selected from the group consisting of reserving execution resources, adding execution resources, moving one or more critical work units to one or more other execution computing machines, cancelling execution steps of the critical work units or of entire critical work units, and combinations thereof.

14. The method of claim 1, wherein the method is performed in real time so as to reduce, in a minimal amount of time, the impact of the execution issue on the execution of the critical work units by the critical execution computing machines.

15. A computer program product, comprising one or more computer readable hardware storage devices having computer readable program code stored therein, said program code containing instructions executable by one or more processors of a computing system to implement a method for improving a functioning of a plurality of critical execution computing machines, said method comprising:
determining, by a promoted critical execution computing machine of the plurality of critical execution computing machines, one or more correction actions for reducing an impact of an execution issue on execution of a plurality of critical work units by respective critical execution computing machines on the execution of the critical work units by the respective critical execution computing machines according to global correction information, local correction information, and peer correction information, wherein the global correction information had been received from a scheduling computing machine and relates to the critical work units and to the critical execution computing machines, wherein the local correction information relates to each corresponding critical work unit and to a status of the promoted critical execution computing machine, and wherein the peer correction information relates to the corresponding critical work units and to a corresponding status of the other critical execution computing machines; and
causing, by the promoted critical execution computing machine, an application of the corresponding correction actions onto the critical execution computing machines, which improves a functioning of the critical execution computing machines by reducing an impact of the execution issue on the execution of the critical work units by the critical execution computing machines.

16. The computer program product of claim 15, wherein one critical work unit of the critical work units had been promoted by the scheduling computing machine to become a promoted critical work unit that is to be executed by the promoted critical execution computing machine.

17. The computer program product of claim 15, wherein the method comprises:
monitoring the execution of the corresponding work units by the execution comp machines for detecting the execution issue in the execution of a first one of the critical work units by a first one of the critical execution computing machines, sending a notification of the execution issue in response to the detecting thereof to the scheduling computing machine by the first critical execution computing machine, determining the critical work units corresponding to the first critical work unit in response to the notification of the execution issue by the scheduling computing machine, selecting the promoted critical work unit among the critical work units by the scheduling computing machine, and notifying the selecting of the promoted critical work unit to the promoted critical execution computing machine by the scheduling computing machine.

18. A computing system, comprising one or more processors, one or more memories, and one or more computer readable hardware storage devices, said one or more hardware storage device containing program code executable by the one or more processors via the one or more memories to implement a method for improving a functioning of a plurality of critical execution computing machines, said method comprising:

determining, by a promoted critical execution computing machine of the plurality of critical execution computing machines, one or more correction actions for reducing an impact of an execution issue on execution of a plurality of critical work units by respective critical execution computing machines on the execution of the critical work units by the respective critical execution computing machines according to global correction information, local correction information, and peer correction information, wherein the global correction information had been received from a scheduling computing machine and relates to the critical work units and to the critical execution computing machines, wherein the local correction information relates to each corresponding critical work unit and to a status of the promoted critical execution computing machine, and wherein the peer correction information relates to the corresponding critical work units and to a corresponding status of the other critical execution computing machines; and causing, by the promoted critical execution computing machine, an application of the corresponding correction actions onto the critical execution computing machines, which improves a functioning of the critical execution computing machines by reducing an impact of the execution issue on the execution of the critical work units by the critical execution computing machines.

19. The computing system of claim 18, wherein one critical work unit of the critical work units had been promoted by the scheduling computing machine to become a promoted critical work unit that is to be executed by the promoted critical execution computing machine.

20. The computing system of claim 18, wherein the method comprises:

monitoring the execution of the corresponding work units by the execution comp machines for detecting the execution issue in the execution of a first one of the critical work units by a first one of the critical execution computing machines, sending a notification of the execution issue in response to the detecting thereof to the scheduling computing machine by the first critical execution computing machine, determining the critical work units corresponding to the first critical work unit in response to the notification of the execution issue by the scheduling computing machine, selecting the promoted critical work unit among the critical work units by the scheduling computing machine, and notifying the selecting of the promoted critical work unit to the promoted critical execution computing machine by the scheduling computing machine.

* * * * *